United States Patent
Zhong

(10) Patent No.: US 10,833,324 B2
(45) Date of Patent: Nov. 10, 2020

(54) ELECTRODES WITH CONTROLLED AMOUNT OF LITHIUM ATTACHED AND METHOD OF MAKING SAME

(71) Applicant: Linda Zhong, Oakland, CA (US)

(72) Inventor: Linda Zhong, Oakland, CA (US)

(73) Assignee: LICAP TECHNOLOGIES, INC., Sacramento, CA (US)

( * ) Notice: Subject to any disclaimer, the term of this patent is extended or adjusted under 35 U.S.C. 154(b) by 692 days.

(21) Appl. No.: 14/835,582

(22) Filed: Aug. 25, 2015

(65) Prior Publication Data

US 2017/0062815 A1 Mar. 2, 2017

(51) Int. Cl.

| | |
|---|---|
| *H01M 4/38* | (2006.01) |
| *H01M 4/04* | (2006.01) |
| *H01M 4/13* | (2010.01) |
| *H01M 4/36* | (2006.01) |
| *H01M 10/05* | (2010.01) |
| *H01M 4/134* | (2010.01) |
| *H01M 4/1395* | (2010.01) |
| *H01M 4/02* | (2006.01) |
| *H01M 10/052* | (2010.01) |

(52) U.S. Cl.
CPC .......... *H01M 4/382* (2013.01); *H01M 4/043* (2013.01); *H01M 4/134* (2013.01); *H01M 4/1395* (2013.01); *H01M 4/366* (2013.01); *H01M 10/052* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 6,001,139 A | * | 12/1999 | Asanuma ................ H01M 4/13 29/623.3 |
| 6,667,000 B1 | | 12/2003 | Nakazato et al. |
| 7,492,571 B2 | | 2/2009 | Zhong et al. |
| 7,791,860 B2 | | 9/2010 | Mitchell et al. |
| 8,213,156 B2 | | 7/2012 | Mitchell et al. |
| 2005/0250011 A1 | | 11/2005 | Mitchell et al. |
| 2006/0078798 A1 | | 4/2006 | van Heuveln et al. |
| 2008/0089006 A1 | * | 4/2008 | Zhong .................. C04B 35/532 361/303 |
| 2008/0094778 A1 | | 4/2008 | Tanizaki et al. |
| 2009/0197168 A1 | * | 8/2009 | Nishida ................ H01G 11/32 429/199 |
| 2009/0223630 A1 | | 9/2009 | Mitchell et al. |
| 2009/0246626 A1 | | 10/2009 | Tasaki et al. |
| 2009/0290288 A1 | | 11/2009 | Mitchell et al. |

(Continued)

OTHER PUBLICATIONS

International Search Report and Written Opinion for PCT/US2013/028200, 6 pages.

(Continued)

*Primary Examiner* — Jonathan Crepeau
*Assistant Examiner* — Angela J Martin
(74) *Attorney, Agent, or Firm* — Stetina Brunda Garred & Brucker

(57) ABSTRACT

A method for fabricating an electrode, includes: determining a thickness of an active layer; selecting a lithium (Li) foil having a specified thickness; determining a Li layer pattern for the Li foil based on a portion of a surface of the active layer to be covered by the Li foil; and pressing the Li layer pattern into the surface of the active layer.

4 Claims, 5 Drawing Sheets

(56) References Cited

U.S. PATENT DOCUMENTS

2009/0321678 A1 12/2009 Zhong et al.
2012/0113566 A1 5/2012 Terui et al.
2013/0070391 A1 3/2013 Zheng
2016/0126023 A1 5/2016 Cao et al.
2017/0062815 A1 3/2017 Zhong

OTHER PUBLICATIONS

Request for Ex Parte Reexamination of U.S. Pat. No. 10,002,717 filed with the United States Patent and Trademark Office on Aug. 1, 2018 (115 pages).

\* cited by examiner

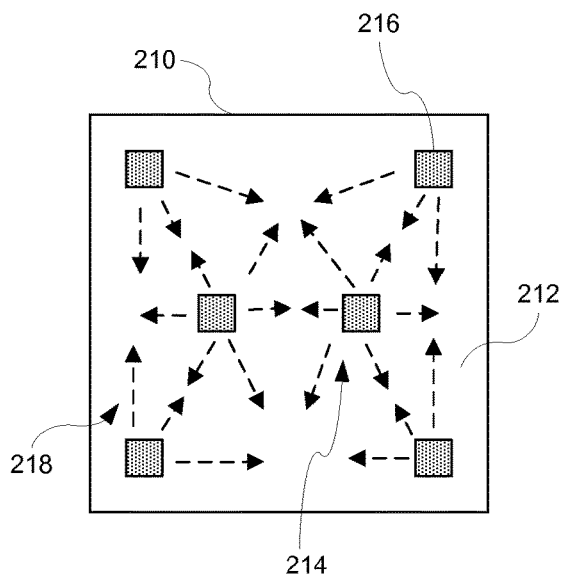 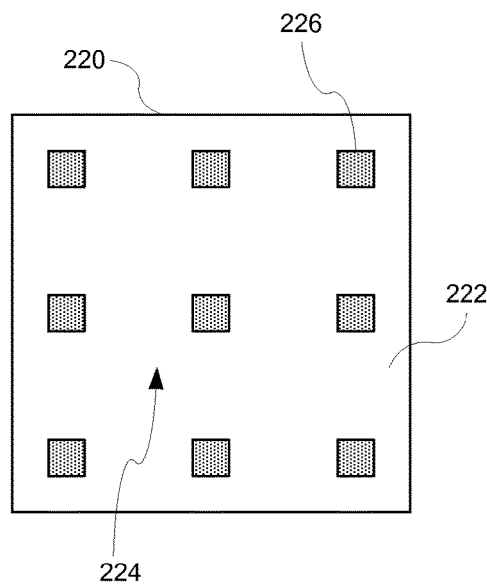
FIG. 2A  FIG. 2B
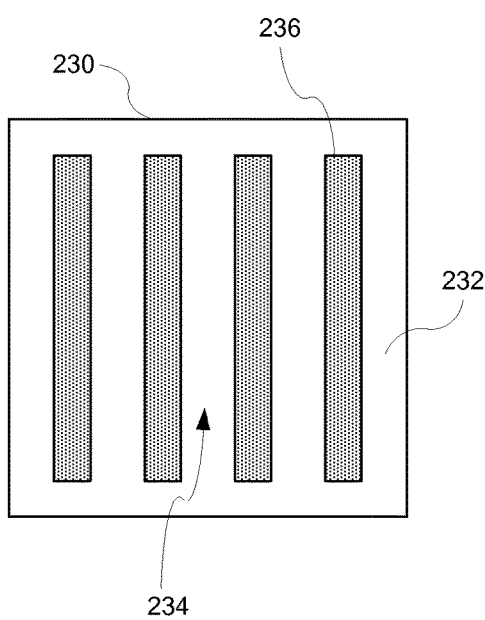 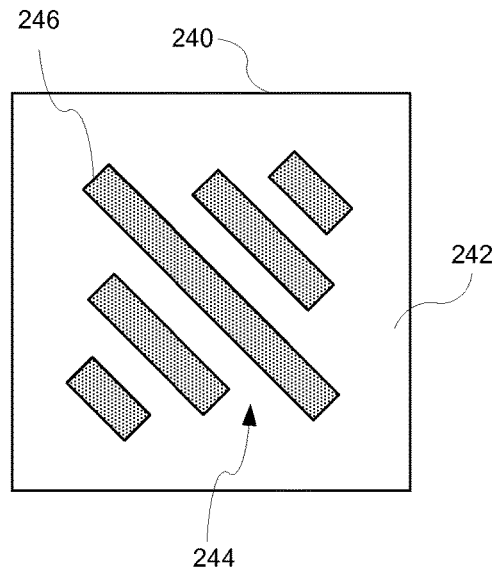
FIG. 2C  FIG. 2D

ELECTRODES WITH CONTROLLED AMOUNT OF LITHIUM ATTACHED AND METHOD OF MAKING SAME

BACKGROUND

1. Technical Field

Apparatuses and methods consistent with the present inventive concept relate to energy storage devices, and more particularly to electrodes for energy storage devices.

2. Related Art

Lithium attachment methods for negative electrodes used in energy storage devices, for example, lithium-ion (Li-ion) batteries and Li-ion capacitors include: 1) the Li attachment and pre-dope method; and 2) the direct contact method.

Li Attachment and Pre-Dope Method: In the Li attachment and pre-dope method, a battery electrode pack is constructed with at least one positive electrode, at least one separator, at least one Li film laminated on a current collector, and at least one negative electrode. The negative electrode is connected to the Li film electrode through the current collector. The battery pack is then immersed in electrolyte that contains Li ions. The Li film is converted into Li ions through the electrode and the Li ions migrate and pre-dope the negative electrode.

Li attachment to negative electrodes requires precise control of the amount of Li attaching to the negative electrode. A low amount of attached Li results in incomplete doping of the negative electrode causing sub-optimal electrode performance. On the other hand, over attaching Li to the negative electrode causes metal Li residue on the negative electrode after the pre-dope process leading to safety issues for energy storage devices that include the electrodes.

In the Li Attachment and Pre-Dope Method, thin Li metal films are normally provided only on the uppermost and lowermost layers of an electrode package. During the Li pre-dope process, the Li ions may be non-uniformly attached into the stacked negative electrode, and the Li metal films may remain on the electrode package after completion of the pre-doping process. Twenty days are required to uniformly dope lithium ions to the negative electrode inside the electrode laminate.

Direct Contact Method: The direct contact method involves uniform mechanical deposition of fine Li powder onto to the negative electrode surface, and pressing the deposited Li powder into the negative electrode surface. A battery electrode pack is constructed with at least one positive electrode, at least one separator, and at least one negative electrode having the surface containing the layer of Li powder. The battery electrode pack is then immersed into an electrolyte that contains Li ions, and the Li pre-doping process starts immediately.

During the pre-doping process, the Li powder is transformed into Li-ion, and the Li powder particle size becomes smaller and smaller. At a certain stage, the particles become so small that, the small Li particles detach themselves from the negative electrode surface and become suspended in the electrolyte around the negative electrode. The negative electrode potential increases during the pre-dope process due to the detachment of the Li particles.

The small detached Li particles may migrate from negative electrode to the higher potential positive electrode through voids in the separator. Once the Li particles arrive on the positive electrode surface, the Li particles dope the positive electrode, reducing the positive electrode potential.

However, migration of the detached Li particles may continue as long as Li particles with small enough size to pass through the separator detach from the negative electrode. Thus, the potentials for both the positive and negative electrodes and the cell open circuit voltage are not stable causing cell premature failure during the applications.

SUMMARY

Apparatuses and methods for fabricating Li electrodes are provided.

According to various embodiments there is provided a method for fabricating an electrode. In some embodiments, the method may include: determining a thickness of an active layer; selecting a lithium (Li) foil having a specified thickness; determining a Li layer pattern for the Li foil based on a portion of a surface of the active layer to be covered by the Li foil; and pressing the Li layer pattern into the surface of the active layer.

According to various embodiments there is provided an electrode. In some embodiments, the electrode may include: a conductive substrate; an active layer adhered to the conductive substrate; and a lithium (Li) layer pattern formed from a Li foil and disposed on a surface of the active layer.

According to various embodiments there is provided a battery electrode pack. In some embodiments, the battery electrode pack may include: a plurality of positive electrodes; a plurality of negative electrodes; a plurality of electrically insulating separators, at least one of the plurality of electrically insulating separators disposed between each of the plurality of positive and negative electrodes.

Each of the plurality of negative electrodes may include: a conductive substrate; an active layer adhered to the conductive substrate; and a lithium (Li) layer pattern disposed on a surface of the active layer.

BRIEF DESCRIPTION OF THE DRAWINGS

FIG. 2A is a diagram illustrating an example pattern of discrete dots or rectangles as a Li layer according to various embodiments;

FIG. 2B is a diagram illustrating another example pattern of discrete dots or rectangles as a Li layer according to various embodiments;

FIG. 2C is a diagram illustrating an example pattern of rectangular stripes as a Li layer according to various embodiments;

FIG. 2D is a diagram illustrating another example pattern of rectangular stripes as a Li layer according to various embodiments;

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1A:
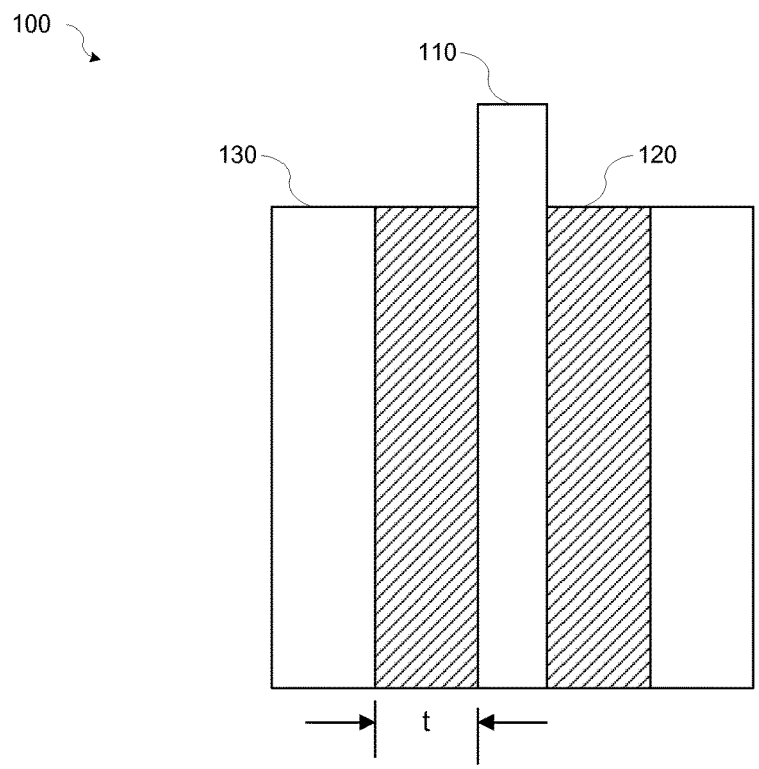
FIGS. 1A and 1B are diagrams illustrating a side view and a front view, respectively, of a structure of an electrode according to various embodiments.
Figure 1B:
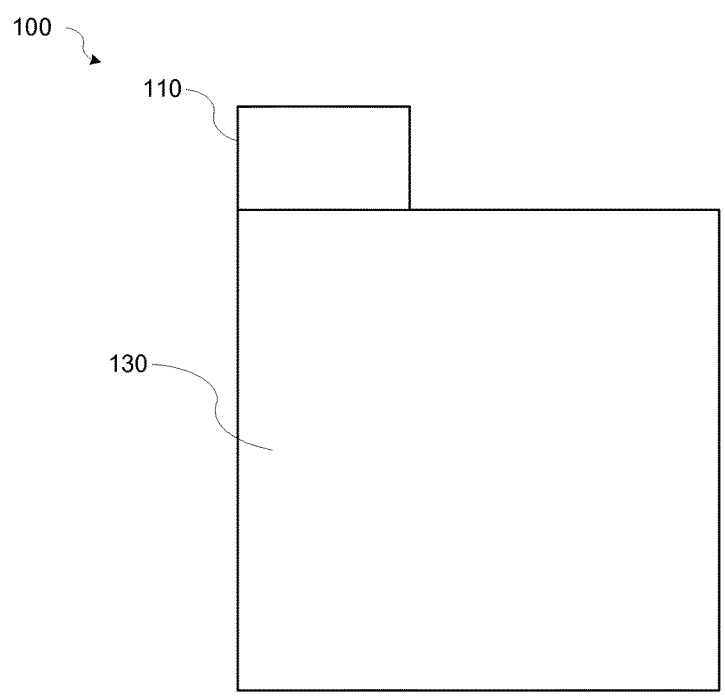

Various embodiments provide electrodes having controlled electrode potentials for energy storage devices. In various embodiments, the electrodes may be configured with a controlled amount of uniformly distributed attached lithium. The electrodes may be incorporated into energy storage, for example, but not limited to, lithium-ion batteries, lithium-ion capacitors, etc. FIGS. 1A and 1B are diagrams illustrating a side view and a front view, respectively, of a structure of an electrode 100 according to various embodiments. Referring to FIGS. 1A and 1B, the electrode 100 may include a substrate 110, an active layer 120, and a Li layer 130.

The substrate 110 may be an inner-most layer and may be a conductive substrate formed from, for example, but not limited to, copper or other conductive material. The active layer 120 may be adhered to the substrate 110. A thickness t of the active layer 120 may be determined based on an energy density and a power density specifications of an energy storage device. The Li layer 130 may be formed from a Li sheet.

Figure 1C:
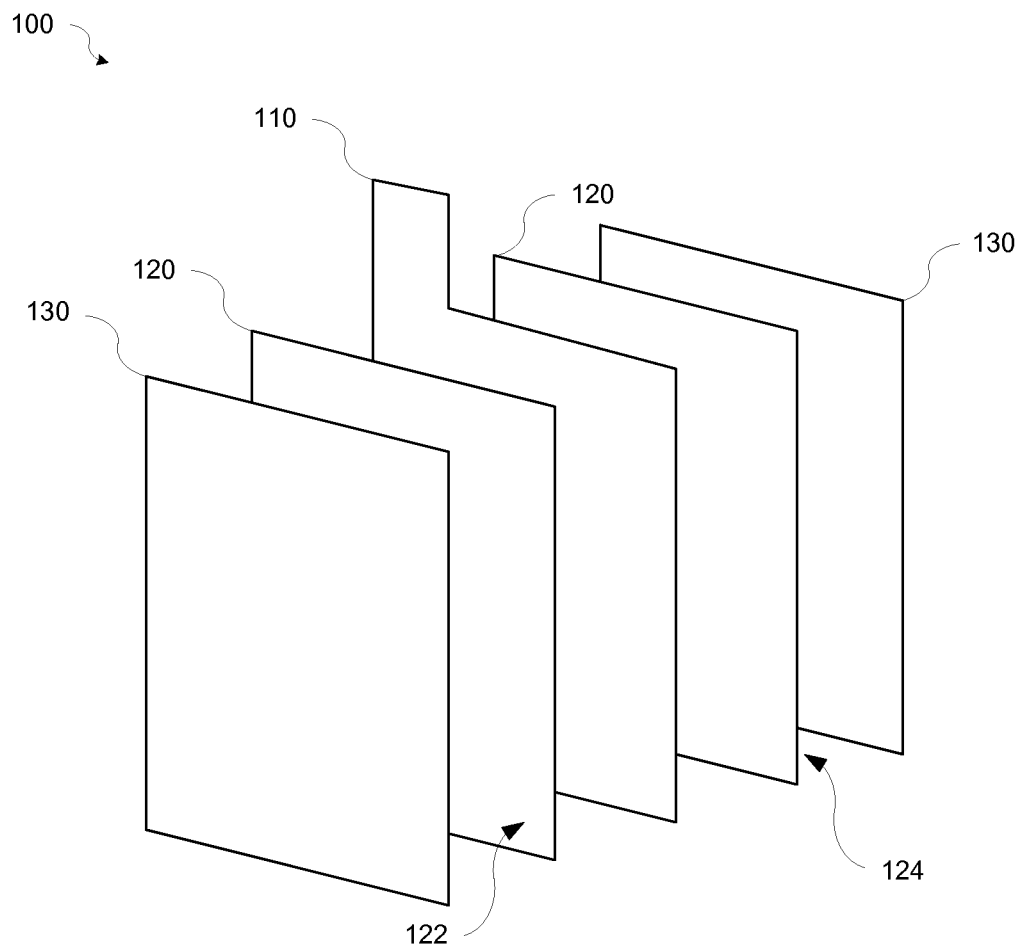
FIG. 1C is a diagram illustrating a view of the layers of an electrode according to various embodiments.

FIG. 1C is a diagram illustrating a view of the layers of an electrode 100 according to various embodiments. Referring to FIG. 1C, the Li layer 130 may cover one hundred percent of a top surface 122 of the active layer 120 and one hundred percent of a bottom surface 124 of the active layer 120. Alternatively, the Li layer 130 may cover less than one hundred percent of the top surface 122 and the bottom surface 124 of the active layer 120. For example, the Li layer 130 may form various patterns on the top surface 122 and the bottom surface 124 of the active layer 120 with various portions of the top surface 122 and the bottom surface 124 of the active layer 120 not covered by the Li layer 130.

When fabricating an electrode, electrode parameters may be specified based on energy density and power density requirements of the electrode. For example, the thickness of the active layer, the weight ratio of the active layer to the Li layer, and the desired coverage of the active layer by the Li layer may be specified based on the requirements of the electrode.

Table 1 lists example electrode requirements for a conventional electrode.

| Requirement | Value |
| --- | --- |
| Li foil coverage on active layer | 100% |
| Weight ratio of active layer to Li layer (WR) | 10:1 |
| Active layer thickness ($t_a$) | 100 μm |
| Density of active material ($D_a$) | 1.08 g/cc |
| Density of Li ($D_{Li}$) | 0.543 g/cc |
| 1 cm² active layer weight ($W_a$) | 0.0108 g |
| 1 cm² Li weight required ($W_{Li}$) | 0.0011 g |
| Li foil thickness ($t_{Li}$) | 20 μm |

In Table 1, the Li foil coverage on active layer, the weight ratio of active layer to Li layer, and the active layer thickness may be specified design parameters, the densities of the active material and Li are known based on the materials, and the active layer weight and Li weight may be calculated to arrive at a required Li foil thickness needed to produce the conventional electrode.

From Table 1, the active layer weight per cm², $W_a$, may be calculated by Equation (1):

$$W_a = D_a \cdot t_a \cdot 1 \text{ cm}^2 \quad (1)$$
$$= 1.08 \frac{\text{g}}{\text{cm}^3} \cdot 0.01 \text{ cm} \cdot 1 \text{ cm}^2$$
$$= 0.0108 \text{ g}$$

The Li layer weight per cm², $W_{Li}$, may be calculated by Equation (2):

$$W_{Li} = \frac{W_a}{WR} \cdot t_a \cdot 1 \text{ cm}^2 \quad (2)$$
$$= \frac{0.0108 \text{ g}}{10}$$
$$= 0.0011 \text{ g}$$

Based on the Li layer weight, $W_{Li}$, and the density of Li, the needed Li foil thickness, $t_{Li}$, may be calculated by Equation (3):

$$t_{Li} = \frac{W_{Li} \frac{\text{g}}{\text{cm}^2}}{D_{Li} \frac{\text{g}}{\text{cm}^3}} \quad (3)$$
$$= \frac{0.0011 \frac{\text{g}}{\text{cm}^2}}{0.543 \frac{\text{g}}{\text{cm}^3}}$$
$$= 20 \text{ μm}$$

Thus, in the example above, a Li foil having a thickness of 20 microns (μm) may be used for an electrode having one-hundred percent Li coverage of the active layer area. However, a thinnest commercially available free standing Li foil may have a thickness greater than the required foil thickness (e.g., a thinnest commercially available Li foil may have a thickness of 45 μm) and therefore cannot be used to fabricate the electrode.

Embodiments of the present inventive concept provide methods for fabricating electrodes using various commercial available free standing Li foil thicknesses and Li foil layer patterns. In the various embodiments, by specifying the Li foil thickness rather than the Li foil coverage on the active layer and applying the Li foil to the active layer in an appropriate pattern, an electrode having specified energy density and power density requirements may be fabricated.

Referring again to Table 1, by selecting a Li foil having a commercially available thickness (e.g., 45 μm), the Li coverage on the active layer may be calculated by dividing the Li foil thickness required at one-hundred percent active layer coverage by the thickness of the available Li foil, $t_{avail}$, as shown in Equation (4):

$$\% \text{ Li coverage} = \frac{t_{Li} \text{ at } 100\% \text{ coverage}}{t_{avail}} \cdot 100 \quad (4)$$
$$= \frac{20 \text{ μm}}{45 \text{ μm}} \cdot 100$$
$$= 44\% \text{ Li coverage}$$

Thus, using an available Li foil thickness of 45 μm, an electrode meeting specified energy density and power density requirements with 44% Li coverage of the active layer may be fabricated using a Li layer foil placement pattern (i.e., a Li layer pattern) on the active layer that may minimize a diffusion distance from the Li layer pattern to the area of the active layer.

In various embodiments, the Li foil thickness may be equal to or less than about 150 μm. A Li foil thickness greater than about 150 μm may result in a long Li pre-dope process due to a smaller contact area between the Li foil and the active layer, and/or portions of the Li foil forming the Li layer pattern may protrude from the surface of the active layer and pierce the separator causing shorts between electrodes.

FIGS. 2A-2C are diagrams illustrating example patterns for the Li layers according to various embodiments. Each of FIGS. 2A-2C illustrate one surface (e.g., the top surface 122 or the bottom surface 124) of an active layer (e.g., the active layer 120) of an electrode (e.g., the electrode 100). FIG. 2A is a diagram illustrating an example pattern 214 of discrete dots (e.g., circles or rectangles) as a Li layer according to various embodiments. Referring to FIGS. 1A-2A, an electrode 210 may include an active layer 212 disposed on a substrate (e.g., substrate 110). A Li layer pattern 214 of, for example, but not limited to, discrete dots or rectangles 216 may be disposed on the active layer 212. The Li dots or rectangles 216 may be formed from, for example, but not limited to, a Li foil. Each dot or rectangle 216 of the Li layer pattern 214 may be disposed on the active layer 212 to minimize a diffusion distance from the Li layer pattern 214 to the area of the active layer 212 while providing a determined amount of Li, thereby providing substantially uniform diffusion 218 of Li throughout the active layer 212.

FIG. 2B is a diagram illustrating another example pattern 224 of discrete dots or rectangles as a Li layer according to various embodiments. Referring to FIGS. 1A-C and 2B, an electrode 220 may include an active layer 222 disposed on a substrate (e.g., substrate 110). A Li layer pattern 224 formed from, for example, but not limited to, a Li foil, may be disposed on the active layer 222. Each dot (e.g., circle or rectangle) 226 of the Li layer pattern 224 may be disposed on the active layer 222 to minimize a diffusion distance from the Li layer pattern 224 to the area of the active layer 222 while providing a determined amount of Li, thereby providing substantially uniform diffusion throughout the active layer 222 (e.g., as illustrated in FIG. 2A).

FIG. 2C is a diagram illustrating an example pattern 234 of rectangular stripes as a Li layer according to various embodiments. Referring to FIGS. 1A-C and 2B, a Li layer pattern 234 formed from, for example, but not limited to, a Li foil, may be disposed on the active layer 222 of an electrode 230. Each stripe 236 of the Li layer pattern 234 may be disposed on the active layer 232 to minimize a diffusion distance from the Li layer pattern 234 to the area of the active layer 232 while providing a determined amount of Li, thereby providing substantially uniform diffusion throughout the active layer 232.

FIG. 2D is a diagram illustrating another example pattern 244 of rectangular stripes as a Li layer according to various embodiments. Referring to FIGS. 1A-C and 2D, a Li pattern 244 formed from, for example, but not limited to, a Li foil, may be disposed on the active layer 242 of an electrode 240. Each stripe 246 of the Li layer pattern 244 may be disposed on the active layer 242 to minimize a Li diffusion distance from the Li layer pattern 244 to the area of the active layer 242 while providing a determined amount of Li, thereby providing substantially uniform diffusion throughout the active layer 242. Each stripe 246 of the Li layer pattern 244 may be disposed such that each stripe 246 is not parallel to edges of the area of the active layer 242.

One of ordinary skill in the art will appreciate that the Li layer patterns illustrated in FIGS. 2A-2D are merely examples and that other Li layer patterns using other shapes to form the patterns may be used without departing from the scope of the present inventive concept. Shapes of the Li foil pieces, for example, but not limited to, discrete Li dots, Li stripes, etc., forming the Li layer patterns that minimize the Li diffusion distance from the Li foil pieces of the Li layer pattern 244 to the area of the active layer 242 may be determined at least in part based on manufacturing considerations.

Figure 3:
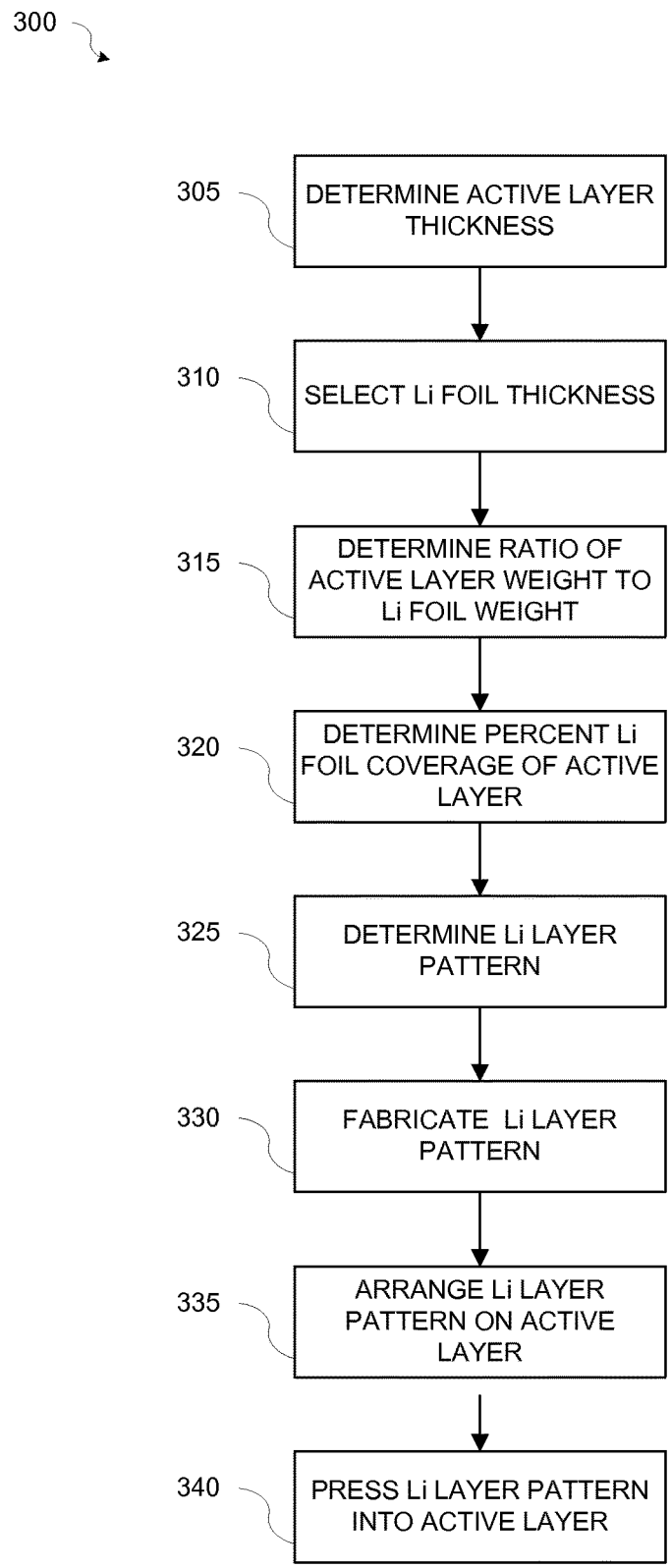
FIG. 3 is a flowchart illustrating a method for fabricating an electrode according to various embodiments.

FIG. 3 is a flowchart for a method 300 for fabricating Li electrodes according to various embodiments. Referring to FIG. 3, at block 305, an electrode active layer thickness may be determined based on an energy density and a power density specifications of an energy storage device. The electrode active layer may be a film layer formed with a combination of, for example, but not limited to, active materials (e.g., graphite, hard carbon, soft carbon, activated carbon, etc.), conductive carbon, and binder. At block 310, a Li foil thickness for fabricating a Li layer pattern may be selected. For example, the Li foil thickness may be selected based on, for example, but not limited to, commercial availability, ability to handle the Li foil without damage, etc. In various embodiments, the Li foil thickness may be equal to or less than 150 μm.

At block 315, a weight ratio of the active layer to the Li layer may be determined. An electrode potential may be made as close to a Li metal potential by maximizing an amount of Li foil. However, the amount of Li foil may be optimized to minimize Li metal residue upon completion of a pre-doping process. For example, the weight ratio of the active layer to the Li layer may be in a range of 6:1 to 10:1.

At block 320, the percent Li foil coverage on the active layer may be determined. For example, the Li foil coverage on the active layer may be calculated by dividing the Li foil thickness required at one-hundred percent active layer coverage by the selected Li foil thickness as explained with respect to Table 1 and Equation (4). At block 325, a Li layer pattern to minimize a diffusion distance from the Li layer pattern to the area of the active layer may be determined based on the percent Li foil coverage on the active layer. For example, the Li layer pattern (e.g., Li dots, Li squares, Li stripes, etc.) that minimizes the Li diffusion distance from the Li layer pattern 244 to the area of the active layer 242 may be determined at least in part based on manufacturing considerations.

At block 330, the determined Li layer pattern layer may be fabricated. For example, Li foil components for the determined Li layer pattern (e.g., Li dots, Li stripes, etc.) may be fabricated. At block 335, the Li layer pattern layer may be arranged on the active layer. At block 340, the Li layer pattern may be pressed into the active layer. For example, the Li layer pattern may be pressed into the active layer using a press applying pressure in a range of 110-120 kilograms per square centimeter ($kg/cm^2$) to the pieces of Li foil forming the Li layer pattern. One of ordinary skill in the art will appreciate that alternative methods to pressing as known in the art to ensure a tight contact between the lithium film and the negative electrode may be used without departing from the scope of the present inventive concept.

Figure 4:
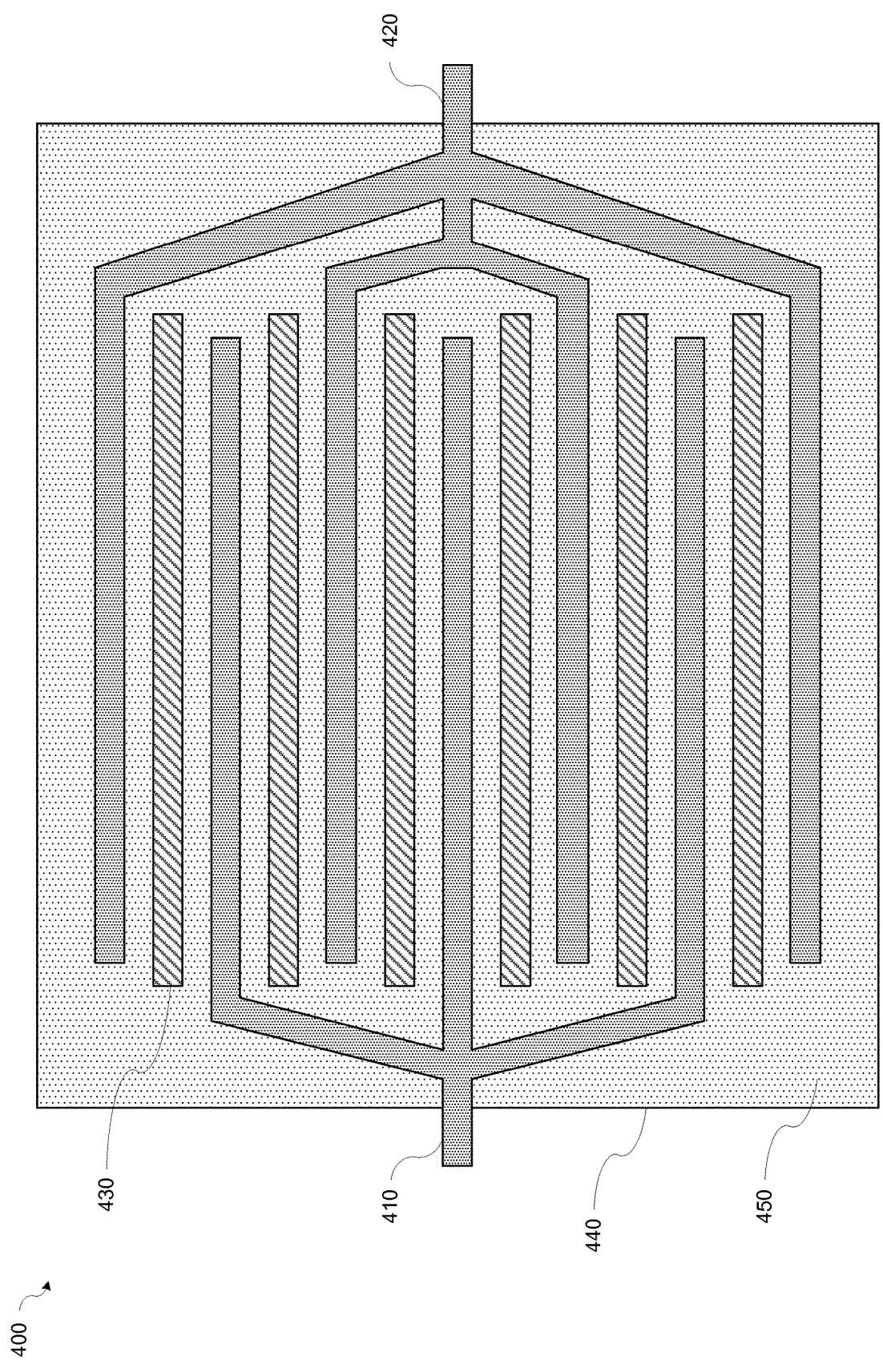
FIG. 4 is a diagram illustrating a battery electrode pack according to various embodiments.

Various embodiments may provide a battery electrode pack. FIG. 4 is a diagram illustrating a battery electrode pack 400 according to various embodiments. Referring to FIG. 4, the battery electrode pack 400 may include at least one positive electrode 410, at least one negative electrode 420 with attached Li foil layer, at least one electrically insulating separator 430 disposed between the positive electrode 410 and the negative electrode 420, and an enclosure 440 configured to contain a predetermined amount of electrolyte 450 that contains lithium ions. The negative electrode 420 may be an electrode produced by the method 300 for fabricating Li pre-doped electrodes according to the various embodiments. The positive electrode 410 may be an electrode by methods known to those of skill in the art.

A pre-doping process may be performed by immersing the battery electrode pack 400 in the electrolyte 450 and monitoring the electrical potential of the negative electrode 420. The electrical potential of the negative electrode 420 may be monitored until the electrical potential of the negative electrode 420 is stabilized (e.g., 24 hours or longer) close to zero volts with respect to a Li reference electrode. The electrical potential of the negative electrode 420 may be monitored using techniques known to those of skill in the art, for example, but not limited to, using a power supply and a voltmeter.

In alternative embodiments, electrodes with a controlled amount of lithium attached and controlled electrode potentials may be fabricated with one-hundred percent Li foil coverage on an active layer by fabricating Li foil in thicknesses not commercially available using a three-dimensional (3D) printer. The Li layer thickness needed to cover one-hundred percent of the electrode surface uniformly may be calculated.

What is claimed is:

1. A method for fabricating an electrode, the method comprising:

determining thickness of an active layer;

selecting a lithium (Li) foil having a specified thickness;

specifying a ratio of a weight of the active layer to a weight of the Li foil;

determining a portion of a surface of the active layer to be covered by the Li foil based on the ratio, the portion being less than fifty percent of the surface of the active layer;

determining a Li layer pattern for the Li foil based on the portion of the surface of the active layer to be covered by the Li foil, said determining the Li layer pattern comprising selecting the Li layer pattern that minimizes a Li diffusion distance on the active layer from a plurality of Li foil pieces forming the Li layer pattern;

positioning the plurality of Li foil pieces on the surface of the active layer in the selected Li layer pattern; and pressing the Li layer pattern into the surface of the active layer.

2. The method of claim 1, wherein shapes of the plurality of Li foil pieces forming the Li layer pattern comprise one or more of squares, circles, and stripes.

3. The method of claim 1, wherein the pressing the Li layer pattern into the surface of the active layer comprises applying pressure in a range of 110-120 kilograms per square centimeter ($kg/cm^2$) to Li foil pieces forming the Li layer pattern.

4. The method of claim 1, wherein the portion of the surface of the active layer to be covered by the Li layer pattern is less than ten percent of the surface of the active layer.

* * * * *